United States Patent
Van Der Ree et al.

(10) Patent No.: US 12,448,573 B2
(45) Date of Patent: Oct. 21, 2025

(54) METHOD AND SYSTEM FOR TRANSFERRING PLASTIC WASTE INTO A FUEL HAVING PROPERTIES OF DIESEL/HEATING OIL

(71) Applicant: BLUEALP INNOVATIONS B.V., Groot-Ammers (NL)

(72) Inventors: Teunis Christiaan Van Der Ree, Groot-Ammers (NL); Gerold Weser, Rütihof/Baden (CH)

(73) Assignee: BLUEALP INNOVATIONS B.V., Groot-Ammers (NL)

(*) Notice: Subject to any disclaimer, the term of this patent is extended or adjusted under 35 U.S.C. 154(b) by 435 days.

(21) Appl. No.: 17/879,944

(22) Filed: Aug. 3, 2022

(65) Prior Publication Data

US 2023/0059944 A1     Feb. 23, 2023

Related U.S. Application Data

(63) Continuation of application No. 15/544,260, filed as application No. PCT/EP2015/000081 on Jan. 19, 2015, now abandoned.

(51) Int. Cl.
| | |
|---|---|
| *C10G 1/10* | (2006.01) |
| *C10G 7/00* | (2006.01) |
| *C10G 7/04* | (2006.01) |
| *C10G 9/00* | (2006.01) |
| *C10G 9/40* | (2006.01) |

(52) U.S. Cl.
CPC ............. *C10G 1/10* (2013.01); *C10G 7/00* (2013.01); *C10G 9/00* (2013.01); *C10G 9/40* (2013.01); *C10G 2300/1003* (2013.01); *C10G 2300/4081* (2013.01); *C10G 2400/04* (2013.01)

(58) Field of Classification Search
None
See application file for complete search history.

(56) References Cited

U.S. PATENT DOCUMENTS

| 11,760,938 B2 * | 9/2023 | Akah ................. B01D 53/52 585/241 |
| 12,291,676 B2 * | 5/2025 | Reimers ............... B29B 7/242 |
| (Continued) | | |

FOREIGN PATENT DOCUMENTS

DE     19722585     * 12/1998     ........... C08J 11/12

*Primary Examiner* — Tam M Nguyen
(74) *Attorney, Agent, or Firm* — HOYNG ROKH MONEGIER B.V.; David P. Owen

(57) ABSTRACT

The invention relates to a method for recovering hydrocarbons from plastic wastes, in particular polyolefin-rich waste, by means of purely thermolytic cracking without the use of catalysts, comprising melting the plastic waste in two heating devices (3) and (4), wherein a recycle stream derived from the cracking reactor (5) and purified in a separator system (8, 9) is admixed with the molten plastic waste from the heating device (3). The mixed plastic stream is further heated in the second heating device (4), and from there is guided into the cracking reactor (5), where the plastic materials are cracked, and by means of subsequent distillation are separated into diesel and low boilers. A special entry system allows the prior separation of water and acidic gases, and the saving of inert gas. The invention further relates to a system for carrying out the method.

13 Claims, 1 Drawing Sheet

(56) References Cited

U.S. PATENT DOCUMENTS

| | | | | |
|---|---|---|---|---|
| 2004/0232046 | A1* | 11/2004 | Tanaka | C10G 9/38 |
| | | | | 422/600 |
| 2004/0261672 | A1* | 12/2004 | Nusimovich | C10G 1/10 |
| | | | | 110/341 |
| 2012/0215043 | A1* | 8/2012 | Gaffney | B01J 37/06 |
| | | | | 502/64 |
| 2018/0010050 | A1* | 1/2018 | Van Der Ree | C10G 7/00 |
| 2023/0070315 | A1* | 3/2023 | Trapp | C10J 3/62 |
| 2023/0110481 | A1* | 4/2023 | DeBruin | C10J 3/00 |
| | | | | 252/373 |
| 2024/0010583 | A1* | 1/2024 | Schmidt | C10G 1/10 |
| 2024/0360372 | A1* | 10/2024 | Jo | B01D 24/10 |
| 2024/0392195 | A1* | 11/2024 | Wu | B01D 53/62 |
| 2024/0399289 | A1* | 12/2024 | Slivensky | C10G 1/002 |
| 2024/0409824 | A1* | 12/2024 | Jeon | B01J 8/0285 |
| 2024/0424540 | A1* | 12/2024 | Polasek | C10G 1/10 |

\* cited by examiner

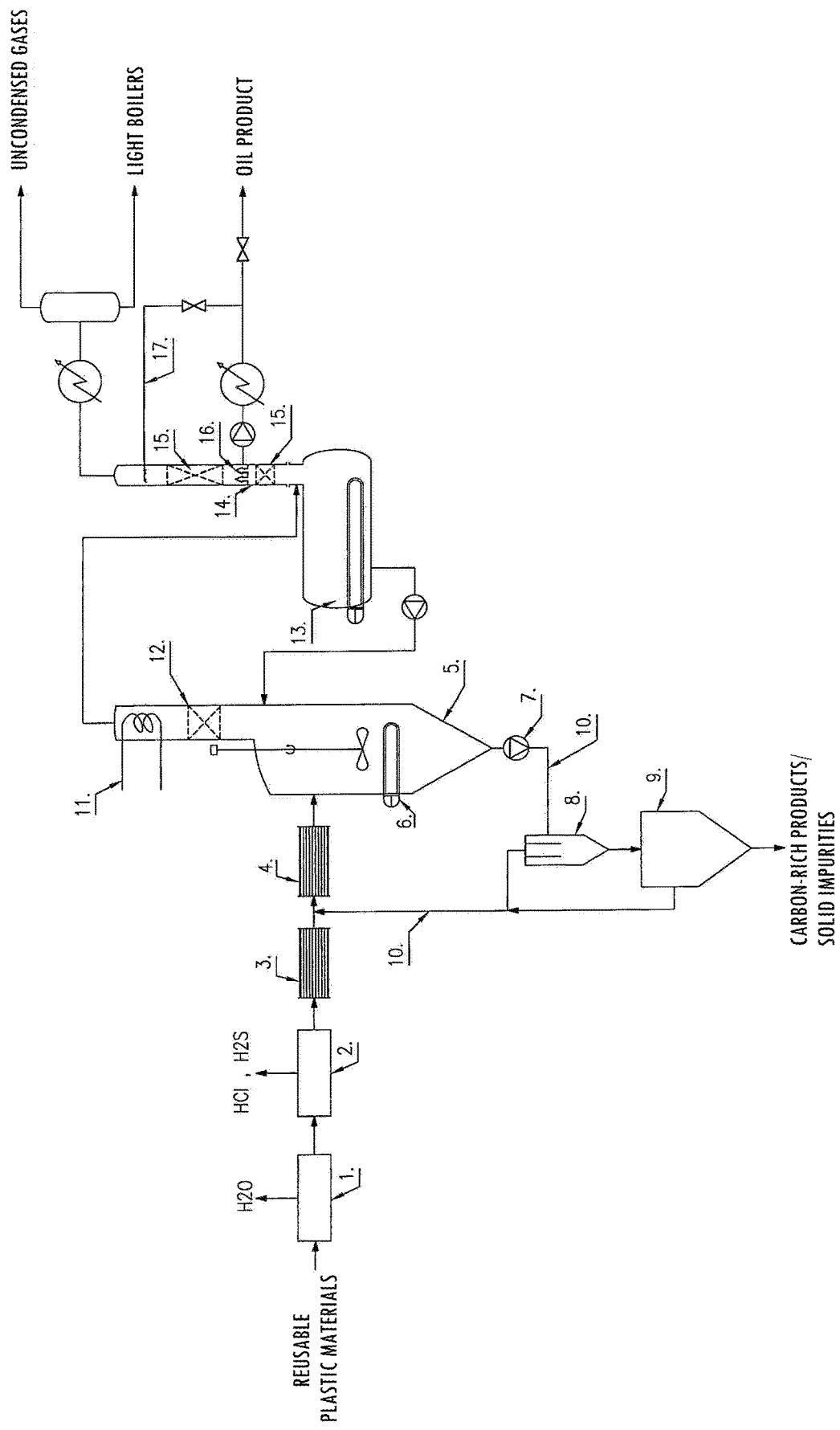

METHOD AND SYSTEM FOR TRANSFERRING PLASTIC WASTE INTO A FUEL HAVING PROPERTIES OF DIESEL/HEATING OIL

FIELD OF THE INVENTION

The invention relates to a method and a facility for processing plastic waste, in particular plastic waste based on (i) polyolefins and/or (ii) crude oil-based organic liquids, with conversion of such plastic waste into hydrocarbons having one C atom (methane) up to hydrocarbons having more than 22 C atoms.

BACKGROUND

In light of finite crude oil reserves, the increasing consumption of plastics, and the ever more stringent regulatory requirements for the processing of waste materials and recycling of reusable materials, the processing of plastic waste, which is sorted from residual waste, for example, is becoming increasingly important.

Several methods for processing plastic waste are already known, but they have various drawbacks.

A processing method is known from WO 2005/071043 A1, in which plastic waste is processed to form oil.

In the process, fractioned hydrocarbons are recovered from plastic waste and/or oil-containing residues, the plastic waste and/or residues first being sorted and compacted using a feed system with exclusion of air.

The compacted mass is supplied to a melting tank and heated therein, resulting in a separation into a first liquid phase, a first gaseous phase, and a residual fraction, after which the first liquid phase and the first gaseous phase are transported into an evaporation tank, in which a second liquid phase and a second gaseous phase result with further heating, and the second liquid phase is transferred to a repeater and heated with further heat input, resulting in a third gaseous phase, after which the second gaseous phase from the evaporation tank and the third gaseous phase from the reheater are supplied to a cracking reactor, in which further cracking of the long-chain hydrocarbons into short-chain hydrocarbons takes place, and the resulting oil gas is subsequently supplied to a condenser in which the oil gas is condensed to form liquid oil, which represents the target product.

This method does not meet present environmental requirements concerning sulfur and chlorine content, results in a high fraction of carbon-rich residues, and has deficiencies with regard to flexibility and quality of the end product.

WO 2008/022790 describes a method for processing plastic-containing waste and organic liquids based on crude oil, cooking oil, fats, or the like, having the following steps:

feeding the substance mixture into a reactor that is divided into a melting zone and a cracking zone, or into two reactors connected in succession, melting the substance mixture in a melting zone of the reactor at 250° C. to 350° C., discharging interfering substances from the melt, cracking long-chain polymers present in the melt in a cracking zone of the reactor at 420° C. to 450° C. until they assume the gaseous state, discharging the gaseous phase from the reactor, condensing the gaseous phase in a cooler, removing impurities from the volatile liquid that is present after cooling (quenching), and storing the volatile liquid.

The gaseous phase that is present downstream from the cracking zone of the reactor is supplied to a distillation unit, for example, which is operated in such a way that long-chain polymers condense and are recirculated to the cracking zone of the reactor. Relatively short-chain gaseous hydrocarbons (C1-C4), which may be present downstream from the distillation unit and a subsequent cooler, may be used as fuel for a source of energy.

In the methods of the prior art, relatively large quantities of dross occur, and the end products have moderate purity and are not very adaptable to the requirements.

DESCRIPTION OF THE INVENTION

The object of the present invention is to provide an improved method for processing plastic waste (also referred to below as reusable plastic materials), and a facility for carrying out this method. The improvements include a reduction in dross formation and/or more flexible product control and/or optimized purity of the products.

This object is achieved by providing a method for recovering hydrocarbons from preferably polyolefin waste by means of purely thermolytic cracking in a cracking reactor, with a first heating device and a second heating device situated upstream therefrom, without using catalysts, wherein (b1) the reusable plastic materials, which are optionally and preferably already partially melted, are supplied to a first heating device in which they are (further) melted at a temperature of 300° C. to 380° C., (b2) the melted reusable plastic materials together with the recycle stream which have been pumped out of the cracking reactor are supplied to a second heating device, in which they are further heated to temperatures of 380° C. to 400° C., (b3) the melted reusable plastic materials together with already formed hydrocarbon-containing vapors are supplied from the second heating device to the cracking reactor, in which the melted reusable plastic materials are further cracked at approximately 400° C., wherein the gaseous hydrocarbons are supplied to a partial condenser in which long-chain hydrocarbons condense, preferably a condenser, upstream from which a packed column is connected, and are returned to the cracking reactor, (b4) short-chain hydrocarbons exit from the cracking reactor and are supplied to a distillation unit in which they are fractionated into a gaseous fraction and a liquid fraction, the liquid fraction being stripped off as diesel product, and the gaseous fraction being led through a cooler in which it is split into light boilers (C5-C7) which are stored, and uncondensed gases (C1-C4) which are preferably used as fuel for heating the thermal oil, (b5) high-energy pitch- and tar-like substances that have not assumed the gaseous state, and excess carbon that results during the thermolytic cracking of polymers, together with the recycle stream are pumped out of the cracking reactor and separated into the recycle stream and the residue by means of a separator device, and the recycle stream between the first heating device and the second heating device is admixed with the melted reusable plastic materials, and the residue is led into a collection tank.

The stripped-off liquids (diesel product and light boilers), before transfer into storage tanks, may be purified in specialized adsorption and/or filtration systems to remove interfering components, such as organic acids, that may have arisen.

A charging system, which is preferably usable for the facility according to the invention but also together with other facilities, includes feeding the plastic waste to the first heating device via a charging system, in which (a2) in a first stage, water vapor is discharged in a mechanical compaction system at 120 to 150° C., and compaction and drying take place, (a3) in a second stage, at least partial melting and removal of acidic gases, in particular HCl and $H_2S$, take place under vacuum in an extruder at 250 to 300° C.

These acidic waste gases are preferably subjected to gas scrubbing with a caustic solution such as a sodium hydroxide solution, after which the scrubbing liquor, which contains practically no hydrocarbons, may be disposed of without problems.

The compaction in the first stage (a2) suitably takes place by means of a screw compactor, and in the second stage (a3) by means of an extruder, whereby the compactor as well as the extruder should be heatable. Thermal oil is a preferred heating medium.

Supplying the reusable plastic materials to a stage (a1) upstream from stage (a2) suitably takes place via a system of at least two, and preferably two, buffer tanks that are preferably acted on and/or flushed with nitrogen, wherein one is filled while the other is emptied, and the two buffer tanks are connected to a weighing system that allows metered filling of the charging system with plastic waste.

The recycle stream mentioned in (b5) above is obtained by pumping melted reusable plastic materials, high-energy pitch- and tar-like substances that have not assumed the gaseous state, and excess carbon that results during the cracking of polymers out of the bottom of the cracking reactor by means of a high-temperature pump and supplying them to a separator system. This separator system is preferably a cyclone separator, optionally and preferably connected to a sedimentation tank (settling tank).

The gaseous hydrocarbons from the cracking reactor are supplied to the partial condenser preferably via a packed column, thus lengthening the path for separating the hydrocarbons that have not yet been sufficiently cracked (typically having more than 22 C atoms). This has the beneficial effect that the partial condenser may be operated at a higher temperature without a significant fraction of hydrocarbons of excessive length being able to leave the cracking reactor, or so that the temperature in the partial condenser does not have to be set so low that a significant fraction of hydrocarbons having 22 or fewer C atoms is returned to the cracking reactor and further cracked there, which would reduce the fraction of longer-chain hydrocarbons in the diesel product.

The gases/vapors exiting from the cracking reactor downstream from the packed column and the condenser are supplied to a distillation unit having a reboiler and a distillation column that is designed, at least in part, as a packed column and provided with an intermediate tray. The gases/vapors are fractionated into a gaseous fraction and a liquid fraction in this distillation unit. The liquid fraction is stripped off at the intermediate tray as diesel product, and the gaseous fraction is stripped off at the top of the distillation column. The gaseous fraction is cooled, so that light boilers (C5-C7/C8) may condense and be stripped off as a liquid fraction. The uncondensed gases (C1-C4) are preferably used as fuel for heating the thermal oil.

The lengths of the hydrocarbons in the individual fractions may be well controlled on the one hand via the temperature of the partial condenser, and on the other hand via the length of the distillation column and the temperature therein and in the cooler.

The facility may be continuously operated due to the feeding of the reusable plastic materials via two buffer systems.

Within the scope of the present invention, tube heat exchangers flushed with thermal oil are preferred first and second heating devices.

To be able to adjust the chain length to the particular needs, it is preferable for the temperature of the partial condenser to be settable in a range of 150° C. to 350° C., for example, and for chain lengths of no more than 22 C atoms, preferably settable to 300° C.

The thermal fine separation of the gas exiting from the cracking reactor preferably takes place by means of counterflow distillation, in which a portion of the diesel product is returned, in particular injected, into the distillation column above the withdrawal point. Due to this return of diesel product to the distillation column, the temperature in this column may be varied or set, for example, in such a way that hydrocarbons having 8-9 to 20-22 C atoms are stripped off at the intermediate tray as diesel product, depending on the setting. In addition, the nature of the hydrocarbon mixture of the light boilers and the uncondensed gases may be varied or specified via the temperature setting during cooling.

Typically, the diesel product and/or the light boilers are stripped off and stored for subsequent uses, while the uncondensed gases (C1-C4) are used directly for a source of energy as fuel for heating the thermal oil.

Impurities possibly present in the diesel product and/or the light boilers, in particular sulfur-containing compounds, haloacids, and organic acids, may be removed by absorption and/or filtration.

A device for processing plastic-containing waste and organic liquids based on crude oil, which is suited in particular for carrying out the method described above, comprises a first heating device, a second heating device, a cracking reactor, and a recycle stream line that leads from a lower area of the cracking reactor via a separator system into the feed line of the melted plastic waste from the first heating device into the second heating device.

In one preferred embodiment, the first and second heating devices are in each case a tube heat exchanger that is flushed with thermal oil. The first and/or the second heating device(s) may also be made up of multiple heating devices connected in series or in parallel, but which as a whole have the properties of the first and second heating devices.

For optimal flexibility, the first and second heating devices and the cracking reactor have heaters that are independently controllable.

Preferred heating devices are heat exchangers designed as tube heat exchangers, the tubes being filled with the melt and flushed with thermal oil. This ensures a preferably large heat transfer surface, which offers the advantage that operations may be carried out with a small temperature difference of the thermal oil (usually no greater than 20° C.) between the desired temperature in the melt and the temperature of the heat transfer medium.

The recycle stream includes, in addition to the plastic melt, carbon-rich particles and nonmeltable impurities that collect in the sump of the cracking reactor. This recycle stream is continuously pumped out of the cracking reactor and led through a separator system in which particles are separated, whereupon the residual stream upstream from the second heating device is resupplied to the plastic melt. A preferred separator system includes a cyclone separator.

This cyclone separator comprises a cylindrical portion with a centrally situated tube. Due to the centrifugal force, larger particles are moved outwardly, so that via the centrally situated tithe, primarily plastic melt and optionally small particles are returned to the cracking reactor via the second heating device.

This circuit, in particular the continuous pumping out, brings about continuous intermixing in the cracking reactor, which in many cases makes additional agitation unnecessary.

In another preferred embodiment, the separator system has, in addition to the cyclone separator, a sedimentation tank which is situated outside the recycle stream line but connected to the cyclone separator, and which, however, may be and preferably is connected to the recycle stream line via a bypass on the heating device side.

The cracking reactor is equipped with a partial condenser, which has a cooling/heating device that is designed in such a way that a defined temperature may be set in the partial condenser. A preferred cooling/heating device contains a heat carrier as heat transfer medium, which by means of a temperature control unit may be brought to a temperature that is necessary to set the required temperature within the partial condenser. Thermal oil is a preferred heat carrier.

A packed column, which generally is unheated, may be situated upstream from this partial condenser, i.e., between the cracking reactor and the partial condenser. This packed column is used for improved separation in the partial condenser.

As a result of the partial condenser, in particular in combination with a packed column, only, or at least predominantly, molecules of a defined chain length exit from the cracking reactor.

A distillation unit, which may be operated in such a way that long-chain molecules condense (diesel product) and exit from the short-chain molecules as a gaseous phase, is situated downstream from the cracking reactor and the partial condenser. This gaseous phase may be partially condensed in a cooler situated downstream from the distillation column (light boilers and uncondensed gases).

The distillation unit includes a reboiler and a distillation column having a region that is preferably designed as a packed column, and likewise preferably having an intermediate tray at which the liquid fraction, for example condensed diesel product, is stripped off. A portion of this liquid fraction, the diesel product, may be returned to the distillation column above the withdrawal point in order to optimize the temperature, which provides better separation of the hydrocarbon fractions.

The cooler, which is intended for further separation of the gaseous phase into light boilers and uncondensed gases, has a heating/cooling device via which a defined temperature, and thus, the composition of the hydrocarbon fractions, is settable in the cooler.

Adsorption and/or filtration units for adsorbing impurities from the volatile liquid and/or the diesel product may be provided downstream from the distillation column and the cooler. These adsorption and/or filtration units may include multiple adsorbers or filters, respectively, which may be connected or disconnected in alternation for adsorption or regeneration.

An overall method, from the delivered waste to the end products, is described in greater detail below.

Purified, presorted polyolefin-rich waste, also referred to below as reusable plastic material, is stored in a bin. The presorting may be carried out using customary methods. The plastics, for example PVC or PET, are identified based on their IR spectra or other features, and foreign matter is removed, for example by means of a selectively placeable air stream. Despite this presorting, the reusable plastic materials may still contain small amounts of interfering substances, such as chlorine- and/or sulfur-containing compounds, rubber, metals, sand, etc., which are removed at a later point in the method.

Since the processing operation must be carried out with substantial exclusion of oxygen in order to prevent undesirable oxidation, the reusable plastic materials are preferably supplied to the facility using the charging system described below. This system has the advantage that continuous flushing with inert gas (nitrogen) may be dispensed with during filling of the melting zones and the cracking reactor, since the charging system filled with at least partially melted reusable plastic materials represents an airtight closure. In principle, however, the facility is also fillable using some other charging system.

The precise, reproducible metering in the charging system according to the invention takes place with the use of two buffer tanks, which are weighed. These buffer tanks may optionally be acted on or flushed with nitrogen. The filling of the system from each buffer tank takes place using a mechanical charging system.

The charging system itself is divided into at least two zones that fulfill different tasks. The plastic mixture to be processed is continuously supplied to the charging system from the buffer tanks, which are filled and emptied in alternation, and in particular is initially supplied to a compactor in which the plastic mixture is homogenized and heated essentially due to friction. If necessary, the heating may be assisted by additional heaters, which may be heated with thermal oil, for example, in particular via the outer wall of the compactor. The material should be heated to a temperature of 120 to 150° C. in the compactor, so that in this stage, water vapor may be evaporated and drawn out, in particular by applying a slight vacuum.

The material is subsequently conveyed into an extruder that is preferably heated with thermal oil, and is heated to approximately 250-300° C. in the extruder. Plastic fractions containing sulfur and chlorine are destroyed at these temperatures. HCl and $H_2S$ are discharged from the extruder via a vacuum pump. The acidic pollutants are preferably neutralized with sodium hydroxide solution in a gas scrubber and disposed of. The waste gas contains only small quantities of hydrocarbons at a maximum temperature of 300° C. In addition to the removal of water, HCl, and $H_2S$ at relatively low temperatures, this technique also has the advantage that continuous flushing with inert gas (nitrogen) may be dispensed with during filling of the heating devices (melting zones) and the cracking reactor, since the charging system and the extruder filled with at least partially melted plastic represent an airtight closure.

The extruder compresses the reusable plastic materials and transports them to a first heating device, which is a first tube heat exchanger in which the reusable plastic materials flow through the tubes flushed with thermal oil as heating medium. The overall heating surface of the tubes is selected to be large enough that operations may be carried is out with a preferably small temperature difference between the heating medium and the reusable plastic materials. Deposition of coke on the tube walls due to cracking processes is minimized in this way. A further advantage of tube heat exchangers is that they are easy to clean. The reusable plastic materials are heated to approximately 380° C. in order to completely melt them.

The outlet of the first heating device, the first heat exchanger, is connected to a recycle stream line. Due to this recycle stream line, the recycle stream, which has been led from the cracking reactor via a cyclone separator that functions as a dross discharge system, is admixed with the plastic melt from the first heating device. The mixed stream flows into a second heating device, which is a second tube heat exchanger, in which the plastic melt is heated to 400° C. The melted reusable plastic materials, together with the cracking gases already produced at this temperature, pass from this second heat exchanger into the cracking reactor. In this reactor the plastic molecules are purely thermolytically cracked, i.e., without using catalysts, at approximately 400° C. to form an essentially gaseous hydrocarbon mixture.

For example, a method has proven very suitable which operates with large heat exchange surfaces, so that despite a good throughput of heat carrier medium, operations may be carried out at a temperature that is no more than approximately 20° C. above the sought temperature. Due to this temperature limitation, coke formation may be largely avoided or at least greatly reduced.

To avoid pyrolytic decomposition reactions, the heat transfer in the cracking reactor preferably does not take place through, or exclusively through, the reactor wall (boiler principle). Heat is preferably introduced over a large surface area with a preferably small temperature difference, so that caking and coke formation may be avoided or at least greatly reduced. Multiple tube heat exchangers or bundles of heating tubes filled with heat carrier medium, in particular heat carrier oil, or through which heat carrier medium flows, situated inside the cracking reactor are a suitable heating medium.

The tube heat exchangers or heating tubes may be easily situated inside the cracking reactor in such a way that, even when they are present, a customary, centrally situated agitator may be dispensed with; i.e., sufficient intermixing of the melt is achieved solely due to the recycle stream that is continuously pumped out and returned.

Due to the large heat transfer surfaces, the heat carrier medium used for heating the plastic melt in the cracking reactor may be held at a comparatively low temperature of preferably 405° C. to 420° C. maximum.

An outlet leading to a high-temperature liquid pump is situated at the lower end of the cracking reactor. This pump is capable of pumping fluids at a temperature of 400° C., and is not adversely affected by possible abrasive components in the plastic melt. High-energy pitch- and tar-like substances that have not assumed the gaseous state as well as excess carbon that results during the cracking of polymers are pumped by a separator system, in particular a cylindrical cyclone separator with a sedimentation tank connected thereto. The tangential speed of the fluid is increased upon entering the cyclone separator due to the dimensions of the cyclone separator.

The increase in the speed of the plastic melt in combination with the cylindrical shape of the cyclone separator results in a centrifugal effect. Higher-density particles are deflected to the outer side of the cyclone, while lighter particles travel into the center of the cyclone separator. These lighter particles together with a majority of the melted plastic are led out of the cyclone through a tube. This tube is advantageously situated parallel to the cylindrical axis and concentrically around this axis. This stream which is led out of the cyclone separator is remixed with melted plastic that comes from the first heating device, and returned to the cracking reactor via the second heating device.

The heavier portions flow downwardly in the cyclone separator, preferably into a settling basin, since they contain increasingly larger quantities of melted plastic. The flow velocity in the settling basin is very low, so that additional separation between high-density portions and low-density portions, i.e., between solid particles and melted plastic, may be achieved.

A phase obtained in the settling basin which is rich in melted plastic may be returned to the recycle stream line via a bypass, and the separated higher-density phase containing the solids is removed and may be used as high-energy fuel.

The gaseous hydrocarbon mixture formed in the cracking reactor flows from the cracking reactor into a partial condenser, preferably first through a packed column and only then into a partial condenser. This partial condenser is preferably actively heatable and/or coolable, in particular coolable, and likewise preferably configured in such a way that hydrocarbons that do not correspond to the desired product characteristic, such as a diesel/heating oil characteristic, condense and flow back into the cracking reactor, where they are further cracked until they are shorter than hydrocarbons having a maximum of 22 C atoms, for example, and are able to pass through the condenser.

It is possible with this technology to largely or even completely avoid the formation of long-chain hydrocarbons (wax/paraffins).

The portion that boils at lower temperatures (for example, less than C20 or C22) is not retained by the condenser, and is sent from the condenser into a quench/distillation unit in which separation of the light boilers and gases (C1-C7/C8) from the middle distillate (C8/C9-C20/C22) is carried out. This quench/distillation unit includes a reboiler (evaporator) and a distillation column.

The sump temperature in this quench/distillation unit is preferably controlled by an evaporator, a so-called reboiler, which may be heated up to 400° C. Hydrocarbons having more than 22 C atoms are accumulated in the reboiler, and pumped from the reboiler back into the cracking reactor.

The distillation column is designed, at least in part, as a packed column. In addition, in a middle area, for example in the middle of the distillation column, a base is preferably provided in which at least a portion of the liquid hydrocarbons are collected. These liquid hydrocarbons are stripped off and cooled, preferably in a heat exchanger. A portion of the cooled liquid is returned to the top of the distillation column as a recycle stream (reflux) for temperature control, preferably subsequently combined with a radical inhibitor that acts as a stabilizer and prevents the re-formation of paraffins in the diesel product.

As mentioned above, the diesel product which is removed from the distillation step and which preferably contains a radical inhibitor, due to the reflux to which such an inhibitor is added, preferably undergoes final cooling in a further heat exchanger and is optionally filtered and processed by means of an adsorption and/or filtration device. After the filtration step and before introduction into a storage tank, an antioxidant is preferably added to prevent decomposition of the diesel product.

The vapor exiting from the top portion of the distillation unit includes the lower-boiling components (gasoline-like hydrocarbons, for example C1 to C8). This vapor is cooled in an actively coolable condenser. The condensate, a light boiler (C5-C8, for example), is discharged into a supply tank. The portion that is uncondensed at room temperature, namely, C1 to C4, i.e., methane to butane, optionally after purification by adsorption desorption processes, for example, is transferred into a supply tank, from which it may be used at a later time in a burner for heating the heat carrier medium, either by means of a compressor, or by being directly supplied to such a burner.

Although an overall method is described here, individual aspects according to the invention are contained therein which may also be used for improving existing facilities, as follows:

(i) Feeding the reusable plastic materials via the specialized feed system. This feed system allows process control with or without small quantities of inert gas (nitrogen), which improves the combustibility of the hydrocarbon-containing gases (C1-C4) discharged from the system.

(ii) By using the specialized feed system that operates in the first zone, i.e., the compactor, at temperatures of 120° C.-150° C., the proportion of water vapor is greatly reduced, resulting in optimization of the gas volume.

(iii) Due to situating the extruder upstream from the heating devices and upstream from the cracking reactor and operating it at 250-300° C., pollutant gases such as HCl and $H_2S$ are expelled without losing appreciable quantities of hydrocarbons. This early separation of acidic gases results in greatly reduced corrosion of the downstream devices operated at higher temperatures.

(iv) The partial condenser, in particular with an upstream packed column, prevents hydrocarbons that exceed a desired length from entering the distillation system.

(v) The distillation unit allows very precise separation of the hydrocarbon fractions into a liquid fraction, such as diesel product, and a gaseous fraction, such as light boilers/uncondensed gases. Due to setting the sump temperature in the reboiler on the one hand, and due to setting the temperature or the temperature profile in the distillation column on the other hand by adapting the reflux to diesel product, the separation of the gas stream, originating directly from the cracking reactor, into short-chain and long-chain fractions may be controlled in a targeted manner.

(vi) A portion of the melted plastic mixture is pumped from the cracking reactor and through a cyclone separator, where the high-density particles are separated. To achieve better separation, the high-density fraction is led from the cyclone into a sedimentation/settling tank in which the liquid has sufficient time to establish a stable equilibrium between lighter and heavier particles, so that an additional portion of plastic melt may be returned. Due to this pumping of base material out of the cracking reactor and separating high-density solids and products in the separator system, on the one hand the formation of deposits in the cracking reactor is reduced or even prevented, and on the other hand, due to the plastic melt that is led in the circuit, intermixing in the cracking reactor is achieved which often makes additional mixing unnecessary.

BRIEF DESCRIPTION OF THE DRAWINGS

Further embodiments, advantages, and applications of the invention result from the dependent claims, and the following description with reference to the FIGURE.

The FIGURE schematically shows the design of a preferred facility according to the invention. The reference numerals in the FIGURE have the meanings given below:

1 compactor
2 extruder
3 first heating device (first heat exchanger)
4 second heating device (second heat exchanger)
5 cracking reactor
6 heater for cracking reactor (heat exchanger)
7 high-temperature pump
8 cyclone separator
9 sedimentation tank/settling tank
10 recycle stream line
11 partial condenser
12 packed column
13 reboiler (evaporator)
14 distillation column
15 packed column
16 intermediate tray
17 recycle stream line

APPROACH(ES) FOR CARRYING OUT THE INVENTION

The method for recovering hydrocarbons, in particular individual fractions of hydrocarbons, from plastic waste, in particular polyolefin waste, by means of pyrolytic cracking is now described in greater detail with reference to the facility diagram illustrated in the FIGURE.

The compactor 1 is preferably filled via two buffer systems (not shown) which are acted on or flushed with nitrogen and which may be weighed to allow accurate determination and control of the quantity of reusable plastic materials introduced. Due to the two buffer systems, the facility may be continuously operated due to the fact that one buffer system is filled while the other buffer system is emptied.

The reusable plastic materials are homogenized, compacted, and heated essentially by friction in the compactor 1, assisted if necessary by a thermal oil heater, preferably in the outer wall of the compactor, in particular a screw compactor. Heating in this compactor to 120-150° C. allows removal of the majority of the contained water. The removal of water may be assisted by applying a vacuum, and is preferably assisted by applying a vacuum.

From the compactor 1, the dried, compacted reusable plastic materials are conveyed into an extruder 2 that is preferably heated with thermal oil, and further heated to approximately 250-300° C., so that at least a portion of the reusable plastic materials is melted. At the extruder 2 a vacuum pump draws off the pollutant gases, in particular the acidic gases HCl and $H_2S$. This feed system 1, 2, formed from the compactor 1 and the extruder 2, and this feed technique also have the advantage that continuous flushing with inert gas (nitrogen) may be dispensed with during filling of the melting zones and the cracking reactor, since the system filled with melted plastic represents an airtight closure.

From this feed system 1, 2, the at least partially melted plastic passes into a first heating device, which is a first tube heat exchanger 3, in which the reusable plastic materials are heated to a temperature of 300° C. to 380° C., so that all plastic is present in melted form.

Downstream from the heat exchanger 3, the reusable plastic materials exiting from same are mixed with a recycle stream. This recycle stream is removed from the cracking reactor 5 by means of the high-temperature pump 7 and led in the recycle stream line 10, via the cyclone separator 8, into the stream of reusable plastic materials exiting from the heat exchanger 3.

The liquid phase, formed from the melted reusable plastic materials originating from the heat exchanger 3 and the recycle stream, is further melted, if necessary, in a second heating device, a second heat exchanger 4, at a temperature of 380° C. to 400° C., where thermal cracking may possibly already begin. The melted reusable plastic materials, together with hydrocarbon-containing vapors that have already formed, are subsequently supplied to the cracking reactor 5, which may optionally be heated by means of the heat exchanger 6, and in which the melted hydrocarbons are cracked at approximately 400° C. The entire plastic melt that is present in the cracking reactor 5 and in the second heat exchanger 4 is continuously circulated by means of the high-temperature pump 7. As a result, on the one hand good intermixing is achieved, and on the other hand the pump is simultaneously used for pumping the dross from the cracking reactor into the separator system 8, 9, formed from the cyclone separator 8 and the sedimentation tank 9, from which it may be discharged. This dross for the most part consists of high-energy pitch- and tar-like substances that have not assumed the gaseous state, and excess carbon that results during the cracking of polymers.

The gaseous hydrocarbons leaving the cracking reactor are supplied to a packed column having a connected partial condenser 10 [sic; 11], in which long-chain hydrocarbons (longer than C22, for example) condense, are returned to the cracking reactor 5, and cracked until they have a maximum chain length of C20 to C22, depending on the setting.

The gases that do not condense (C1-C20/C22) in the customarily unheated packed column 12 or in the partial condenser 11 are supplied to a distillation unit 13, 14, 15, 16, in which they are fractionated into a gaseous fraction and a liquid fraction, and from which the liquid fraction is stripped off as middle distillate, and the gaseous fraction is stripped off as light boilers and uncondensed gases, from the distillation unit 13, 14, 15, 16.

The distillation unit 13, 14, 15, 16 includes a reboiler 13 and a distillation column 14. The distillation column 14 preferably has a region designed as a packed column 15, and optionally within this region containing packing or preferably above this region, an intermediate tray 16 on which the liquid fraction (diesel product) is collected and may be discharged. The diesel product discharged from the distillation unit 13, 14, 15, 16 is preferably cooled by means of a heat exchanger, and a portion of this cooled diesel product may be recirculated to the distillation unit via the recycle stream line 17 in order to set optimal temperature conditions. The recirculation, i.e., reflux, usually takes place at the top of the distillation device, but in any case, above the intermediate tray 16, which is the withdrawal point of the diesel product.

A radical inhibitor that prevents the formation of long-chain paraffins, etc., is preferably added to the diesel product used as reflux. This addition suitably takes place downstream from the heat exchanger and downstream from the branch point of the reflux stream.

The discharged liquids may be purified in adsorption and/or filtration systems, and any interfering components (organic acids, for example) may be removed, before the hydrocarbons are transferred into a storage tank.

At least a stabilizer is preferably added to the diesel product before it is stored.

Those skilled in the art are familiar with radical inhibitors, as well as stabilizers and antioxidants. A suitable radical inhibitor is butylhydroxytoluene (BHT), for example, suitable stabilizers are strongly basic amines, for example, and a suitable antioxidant is phenyl diamine, for example.

Although preferred embodiments of the invention are described in the present patent application, it is expressly pointed out that the invention is not limited thereto, and may be carried out in some other way within the scope of the following claims.

The invention claimed is:

1. A method for recovering hydrocarbons from reusable plastic materials comprising plastic-containing waste and organic liquids based on crude oil, from polyolefin-rich reusable plastic materials, by means of thermolytic cracking in a cracking reactor having a first heating device and a second heating device situated upstream therefrom, wherein the supplying of the plastic waste to the first heating device takes place via a feed system in which:
   in a first stage, water vapor is discharged in a mechanical compactor at 120° C. to 150° C., and compaction and drying take place, and
   in a second stage, at least partial melting and removal of acidic gases, in particular HCl and $H_2S$, take place under vacuum in an extruder at 250° C. to 300° C.

2. The method according to claim 1, wherein the compaction in the first stage takes place by means of a screw compactor.

3. The method according to claim 1, wherein:
   the reusable plastic materials are introduced into the feed system via a system of at least two buffer tanks, wherein at least one buffer tank is filled while at least one other buffer tank is emptied into the feed system, and all buffer tanks are connected to a weighing system that allows metered filling of the charging system with plastic waste.

4. The method according to claim 1, wherein the recycle stream is obtained by pumping melted reusable plastic materials, high-energy pitch-and tar-like substances that have not assumed the gaseous state, and excess carbon that results during the cracking of polymers out of the bottom of the cracking reactor by means of a high-temperature pump and supplying them to a separator system, the separator system including a cyclone separator and a sedimentation/settling tank.

5. The method according to claim 1, wherein the gaseous hydrocarbons from the cracking reactor are supplied to the partial condenser via a packed column.

6. The method according to claim 1, wherein the gases from the cracking reactor, downstream from the partial condenser, are supplied to a distillation unit having a reboiler and a distillation column, the distillation column having a packed column and an intermediate tray, and the gases from the cracking reactor are fractionated into a gaseous fraction and a liquid fraction in the distillation unit, and the liquid fraction is stripped off at the intermediate tray as diesel product, and of the stripped-off gaseous fraction, the light boilers are condensed and separated from the uncondensed gases.

7. The method according to claim 1, wherein the facility is continuously operated.

8. The method according to claim 1, wherein the first heating device and the second heating device are in each case a tube heat exchanger that is flushed with thermal oil.

9. The method according to claim 1, wherein the partial condenser is settable to a temperature in a range from 150° C. to 350° C., as the result of which the chain length of the molecules that are able to pass through the partial condenser may also be set.

10. The method according to claim 1, wherein the thermal fine separation of the gas exiting from the cracking reactor is carried out in the distillation column by means of counterflow distillation, in such a way that a portion of the diesel product stripped off at the intermediate tray is returned to the top of the distillation column via a recycle stream line, after cooling, and combined with a radical inhibitor.

11. The method according to claim 9, wherein the nature of the hydrocarbon mixtures is defined via the temperature setting in the distillation column and/or in the condenser, in which a portion of the gaseous fraction is condensed.

12. The method according to claim 1, wherein impurities possibly still present in the diesel product and/or in the light boilers, are removed by absorption and/or filtration.

13. The method according to claim 1, wherein short-chain gaseous hydrocarbons that are present downstream from the condenser are used as fuel for a source of energy.

\* \* \* \* \*